US012763358B2

(12) United States Patent
Radhakrishnan et al.

(10) Patent No.: US 12,763,358 B2
(45) Date of Patent: Oct. 13, 2026

(54) ELECTROLYTE FORMULATION WITH SILICON-CONTAINING ADDITIVE FOR LITHIUM-ION BATTERIES

(71) Applicant: Nissan North America, Inc., Franklin, TN (US)

(72) Inventors: Balachandran Gadaguntla Radhakrishnan, Palo Alto, CA (US); Shigemasa Kuwata, Mountain View, CA (US); Somayeh Zamani, Novi, MI (US); Bharat Gattu, Farmington, MI (US); Dianne Atienza Hay, Hartland, MI (US); Simran Kumari, Los Angeles, CA (US)

(73) Assignee: Nissan North America, Inc., Franklin, TN (US)

( * ) Notice: Subject to any disclaimer, the term of this patent is extended or adjusted under 35 U.S.C. 154(b) by 563 days.

(21) Appl. No.: 18/341,313

(22) Filed: Jun. 26, 2023

(65) Prior Publication Data

US 2025/0006979 A1 Jan. 2, 2025

(51) Int. Cl.
*H01M 10/0525* (2010.01)
*H01M 4/38* (2006.01)
(Continued)

(52) U.S. Cl.
CPC ....... *H01M 10/0525* (2013.01); *H01M 4/386* (2013.01); *H01M 4/583* (2013.01);
(Continued)

(58) Field of Classification Search
CPC .. H01M 10/0525; H01M 4/386; H01M 4/583; H01M 10/0567; H01M 10/0568;
(Continued)

(56) References Cited

U.S. PATENT DOCUMENTS

| | | | |
|---|---|---|---|
| 9,190,698 | B2 | 11/2015 | Smart et al. |
| 10,707,521 | B2 | 7/2020 | Cheng et al. |

(Continued)

FOREIGN PATENT DOCUMENTS

| | | | | |
|---|---|---|---|---|
| CN | 109742445 A | 5/2019 | | |
| EP | 4160775 A1 * | 4/2023 | ........ | H01M 10/0567 |
| WO | WO-2006124738 A1 * | 11/2006 | ........ | H01M 10/4235 |

OTHER PUBLICATIONS

Aurbach, et al.,; On the capacity fading of LiCoO2 intercalation electrodes:: the effect of cycling, storage, temperature, and surface film forming additives, Electrochimica Acta, vol. 47, Issue 27, 2002, pp. 4291-4306, ISSN 0013-4686, https://doi.org/10.1016/S0013-4686(02)00417-6.

(Continued)

*Primary Examiner* — Daniel H Lee
(74) *Attorney, Agent, or Firm* — Young Basile Hanlon & MacFarlane, P.C.

(57) ABSTRACT

A lithium-ion battery has anode active material, nickel-based cathode active material, and an electrolyte. The electrolyte has the following formulation: a carbonate-based solvent; $LiPF_6$; vinylene carbonate; and an additive that satisfies the following: less than or equal to nine carbons; at least one unsaturated bond; a predicted oxidation potential $V_{ox}$ of $2.0<V_{ox}<4.5$; and a five-membered ring with a silicon heteroatom.

12 Claims, 1 Drawing Sheet

(51) Int. Cl.

| | |
|---|---|
| ***H01M 4/583*** | (2010.01) |
| ***H01M 10/0567*** | (2010.01) |
| ***H01M 10/0568*** | (2010.01) |
| ***H01M 10/0569*** | (2010.01) |
| *H01M 4/02* | (2006.01) |

(52) U.S. Cl.
CPC ... *H01M 10/0567* (2013.01); *H01M 10/0568* (2013.01); *H01M 10/0569* (2013.01); *H01M 2004/027* (2013.01); *H01M 2004/028* (2013.01)

(58) Field of Classification Search
CPC ....... H01M 10/0569; H01M 2004/027; H01M 2004/028; H01M 4/587; H01M 2300/0025; H01M 4/131; H01M 4/133; H01M 4/134; H01M 4/525; Y02E 60/10
See application file for complete search history.

(56) References Cited

U.S. PATENT DOCUMENTS

| | | | |
|---|---|---|---|
| 10,978,738 | B2 | 4/2021 | Cheng et al. |
| 2015/0079466 | A1 | 3/2015 | Yoon |
| 2019/0198912 | A1 | 6/2019 | Sella et al. |

OTHER PUBLICATIONS

Zheng, et al., Construction of a Stable LiNi0.8Co0.1Mn0.1O2 (NCM811) Cathode Interface by a Multifunctional Organosilicon Electrolyte Additive; ACS Applied Energy Materials 2020 3 (3), 2837-2845;DOI: 10.1021/acsaem.9b02486.

Roby Gauthier et al., A Joint DFT and Experimental Study of an Imidazolidinone Additive in Lithium-Ion Cells; 2019 J. Electrochem. Soc. 166 A3707; DOI 10.1149/2.1091914jes.

Roby Gauthier et al Impact of Functionalization and Co-Additives on Dioxazolone Electrolyte Additives; 2020 J. Electrochem. Soc. 167 080540; DOI 10.1149/1945-7111/ab8ed6.

Kim et al., Surface Complex Formation between Aliphatic Nitrile Molecules and Transition Metal Atoms for Thermally Stable Lithium-Ion Batteries; ACS Appl. Mater. Interfaces 2014, 6, 11, 8913-8920; Publication Date:May 17, 2014; https://doi.org/10.1021/am501671p.

T. Taskovic et al., Optimizing Electrolyte Additive Loadings in NMC532/Graphite Cells: Vinylene Carbonate and Ethylene Sulfate; 2021 J. Electrochem. Soc. 168 010514; DOI 10.1149/1945-7111/abd833.

Gao H, Maglia F, Lamp P, Amine K, Chen Z. Mechanistic Study of Electrolyte Additives to Stabilize High-Voltage Cathode-Electrolyte Interface in Lithium-Ion Batteries. ACS Appl Mater Interfaces. Dec. 27, 2017;9(51):44542-44549. doi: 10.1021/acsami.7b15395. Epub Dec. 15, 2017. PMID: 29211441.

Dong et al., Stabilizing interface layer of LiNi0.5Co0.2Mn0.3O2 cathode materials under high voltage using p-toluenesulfonyl isocyanate as film forming additive; Journal of Power Sources, vol. 344, 2017, pp. 111-118, ISSN 0378-7753,.

Ma, Xiaowei & Young, R. & Ellis, Leah & Ma, Lin & Li, Jing & Dahn, J.. (2019). 1,2,6-Oxadithiane 2,2,6,6-tetraoxide as an Advanced Electrolyte Additive for Li[Ni 0.5 Mn 0.3 Co 0.2 ]O 2 /Graphite Pouch Cells. Journal of The Electrochemical Society. 166. A2665-A2672. 10.1149/2.1401912jes.

Weimin Zhao, Guorui Zheng, Min Lin, Wengao Zhao, Dongjiang Li, Xiaoyun Guan, Yajuan Ji, Gregorio F. Ortiz, Yong Yang, Toward a stable solid-electrolyte-interfaces on nickel-rich cathodes: LiPO2F2 salt-type additive and its working mechanism for LiNi0.5Mn0.25Co0.25O2 cathodes; Journal of Power Sources, vol. 380, 2018, pp. 149-157, ISSN 0378-7753,.

Xianhui Zhang, Lianfeng Zou, Zehao Cui, Hao Jia, Mark H. Engelhard, Bethany E. Matthews, Xia Cao, Qiang Xie, Chongmin Wang, Arumugam Manthiram, Ji-Guang Zhang, Wu Xu,; Stabilizing ultrahigh-nickel layered oxide cathodes for high-voltage lithium metal batteries; Materials Today, vol. 44, 2021, pp. 15-24, ISSN 1369-7021,.

Xiaowan Zhang, Qingping Wu, Xiang Guan, Fahai Cao, Chilin Li, Jun Xu; Lithium dendrite-free and fast-charging for high voltage nickel-rich lithium metal batteries enabled by bifunctional sulfone-containing electrolyte additives; Journal of Power Sources, vol. 452, 2020, 227833, ISSN 0378-7753,.

Jie-Nan Zhang, Qinghao Li, Yi Wang, Jieyun Zheng, Xiqian Yu, Hong Li, Dynamic evolution of cathode electrolyte interphase (CEI) on high voltage LiCoO2 cathode and its interaction with Li anode, Energy Storage Materials, vol. 14, 2018, pp. 1-7, ISSN 2405-8297,.

Xu, GL., Liu, Q., Lau, K.K.S. et al. Building ultraconformal protective layers on both secondary and primary particles of layered lithium transition metal oxide cathodes. Nat Energy 4, 484-494 (2019). https://doi.org/10.1038/s41560-019-0387-1.

C. Wölke, D. Diddens, B. Heidrich, M. Winter, I. Cekic-Laskovic, ; Understanding the Effectiveness of Phospholane Electrolyte Additives in Lithium-Ion Batteries under High-Voltage Conditions; ChemElectroChem 2021, 8, 972.

Arefeh Kazzazi, Dominic Bresser, Matthias Kuenzel, Maral Hekmatfar, Johannes Schnaidt, Zenonas Jusys, Thomas Diemant, R.Jürgen Behm, Mark Copley, Krzystof Maranski, James Cookson, Iratxe de Meatza, Peter Axmann, Margret Wohlfahrt-Mehrens, Stefano Passerini,; Synergistic electrolyte additives for enhancing the performance of high-voltage lithium-ion cathodes in half-cells and full-cells,; Journal of Power Sources, vol. 482, 2021, 228975, ISSN 0378-7753,.

Han et al., ; Anchoring Interfacial Nickel Cations on Single-Crystal LiNi0.8Co0.1Mn0.1O2 Cathode Surface via Controllable Electron Transfer; ACS Energy Lett. 2020, 5, 7, 2421-2433; Publication Date:Jun. 23, 2020.

Du, Z., Peng, W., Wang, Z et al. Improving the electrochemical performance of Li-rich Li1.2Ni0.13Co0.13Mn0.54O2 cathode material by LiF coating. Ionics 24, 3717-3724 (2018). https://doi.org/10.1007/s11581-018-2556-9.

Zaynab Khodr et al ; Electrochemical Study of Functional Additives for Li-Ion Batteries; 2020 J. Electrochem. Soc. 167 120535.

An, F., Zhao, H., Zhou, W. et al. S-containing and Si-containing compounds as highly effective electrolyte additives for SiOx-based anodes/NCM 811 cathodes in lithium ion cells. Sci Rep 9, 14108 (2019). https://doi.org/10.1038/s41598-019-49568-1.

W. Zhao, L. Zou, J. Zheng, H. Jia, J. Song, M. H. Engelhard, C. Wang, W. Xu, Y. Yang, J.-G. Zhang, ; Simultaneous Stabilization of LiNi0.76Mn0.14Co0.10O2 Cathode and Lithium Metal Anode by Lithium Bis(oxalato)borate as Additive; ChemSusChem 2018, 11, 2211.

Gu-Yeon Kim and J. R. Dahn; The Effect of Some Nitriles as Electrolyte Additives in Li-Ion Batteries; 2015 J. Electrochem. Soc. 162 A437.

Daniel Pritzl et al; Analysis of Vinylene Carbonate (VC) as Additive in Graphite/LiNi0.5Mn1.5O4 Cells; 2017 J. Electrochem. Soc. 164 A2625.

L. El Ouatani et al.,; The Effect of Vinylene Carbonate Additive on Surface Film Formation on Both Electrodes in Li-Ion Batteries; 2009 J. Electrochem. Soc. 156 A103.

Zheng, Q., Yamada, Y., Shang, R. et al. A cyclic phosphate-based battery electrolyte for high voltage and safe operation. Nat Energy 5, 291-298 (2020). https://doi.org/10.1038/s41560-020-0567-z.

Li, J., Li, W., You, Y., Manthiram, A.,; Extending the Service Life of High-Ni Layered Oxides by Tuning the Electrode-Electrolyte Interphase; Adv. Energy Mater. 2018, 8, 1801957.

Ye Zhu et al.,Positive Electrode Passivation by LiDFOB Electrolyte Additive in High-Capacity Lithium-Ion Cells; 2012 J. Electrochem. Soc. 159 A2109.

Dong et al., ; Insights into the Dual Role of Lithium Difluoro(oxalato)borate Additive in Improving the Electrochemical Performance of NMC811||Graphite Cells; ACS Appl. Energy Mater. 2020, 3, 1, 695-704; Publication Date:Dec. 13, 2019.

Han et al., Interfacial Architectures Derived by Lithium Difluoro(bisoxalato) Phosphate for Lithium-Rich Cathodes with Superior Cycling Stability and Rate Capability; ChemElectroChem 2017, 4, 56.

(56) References Cited

OTHER PUBLICATIONS

Zhi et al., Understanding How Nitriles Stabilize electrolyte/Electrode Interface at High Voltage; J. Phys. Chem. Lett. 2017, 8, 24, 6048-6052; Publication Date:Nov. 30, 2017.
Aupperle et al., Realizing a high-performance LiNi0.6Mn0.2Co0.2O2/ silicon-graphite full lithium ion battery cell via a designer electrolyte additive; J. Mater. Chem. A, 2020,8, 19573-19587.
Zhao et al., Tale of Three Phosphate Additives for Stabilizing NCM811/Graphite Pouch Cells: Significance of Molecular Structure-Reactivity in Dictating Interphases and Cell Performance; ACS Appl. Mater. Interfaces 2021, 13, 25, 29676-29690 Publication Date:Jun. 17, 2021.
Wang et al., "Regulation of Cathode-Electrolyte Interphase via Electrolyte Additives in Lithium Ion Batteries", Chemistry An Asian Journal, vol. 15, Issue18, Sep. 15, 2020, pp. 2803-2814.
Li et al., "Construction of Low-Impedance and High-Passivated Interphase for Nickel-Rich Cathode by Low-Cost Boron-Containing Electrolyte Additive", ChemSusChem Chemistry-Sustainability-Energy-Materials, vol. 15, Issue11, Jun. 8, 2022, 9 pages.

* cited by examiner

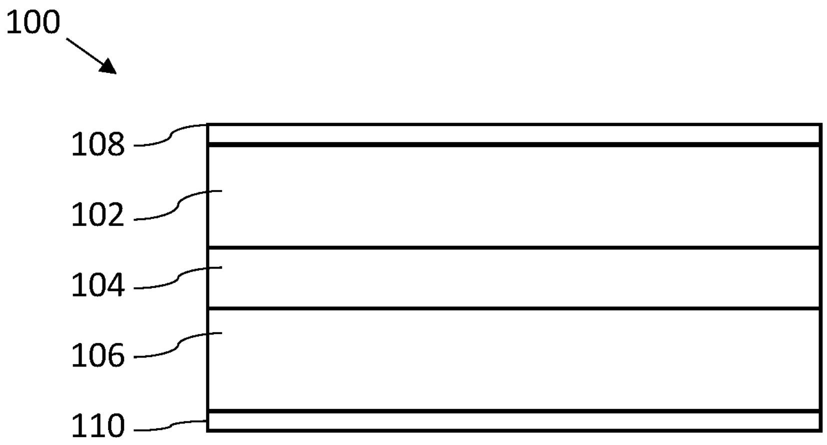
100
108
102
104
106
110

ELECTROLYTE FORMULATION WITH SILICON-CONTAINING ADDITIVE FOR LITHIUM-ION BATTERIES

TECHNICAL FIELD

This disclosure relates to liquid electrolyte formulations for lithium-ion batteries having a functionalized additive containing silicon for a stable cathode-electrolyte-interface (CEI).

BACKGROUND

A conventional electrolyte formulation for a lithium-ion battery will include a lithium salt such as $LiPF_6$ and a carbonate-based solvent. When a small amount of water is naturally introduced to the battery, the water reacts with the salt, forming hydrogen fluoride, which reacts with the transition metals in the cathode active material. This is particularly pervasive when the cathode active material includes nickel. The nickel is pulled into the electrolyte, decreasing the cell capacity.

Although nickel-rich cathode active materials are of interest owing to their high specific capacities, nickel-rich cathode active material faces other challenges. It is challenging to stabilize the nickel-rich cathode interface over long-term cycling, due in part to parasitic reactions, including electrolyte permeation, which results in the growth of impedance and capacity decay.

SUMMARY

Disclosed herein are implementations of lithium-ion batteries that incorporate one or more electrolyte additives that are specifically functionalized with a five-membered ring with a silicon heteroatom to organically create a physical barrier on the cathode surface. The physical barrier is a protective, uniform film that improves the interface stability, inhibits the decomposition of the electrolyte, inhibits the side reactions at the interface, scavenges hydrogen fluoride and/or water, with hydrogen fluoride quenching preferred, and oxidizes before the electrolyte solvents.

One implementation of a lithium-ion battery as disclosed has anode active material, nickel-based cathode active material, and an electrolyte. The electrolyte has the following formulation: a carbonate-based solvent; $LiPF_6$; vinylene carbonate; and an additive that satisfies the following: less than or equal to nine carbons; at least one unsaturated bond; a predicted oxidation potential $V_{ox}$ of $2.0<V_{ox}<4.5$; and a five-membered ring with a silicon heteroatom.

Another implementation of a lithium-ion battery as disclosed herein has anode active material, nickel-based cathode active material, and an electrolyte. The electrolyte has a solvent, a lithium salt, vinylene carbonate, and one or more additives. Each additive has: less than or equal to nine carbons; at least one unsaturated bond; a predicted oxidation potential $V_{ox}$ of $2.0<V_{ox}<4.5$; and atoms selected from the group consisting of: C; H; O; N; S and Si.

Also disclosed is a liquid electrolyte for a lithium-ion battery, comprising one or more additives selected from the group consisting of:

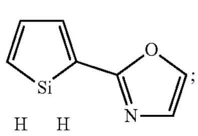 ; 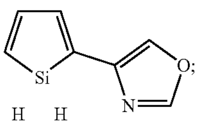 ;

-continued

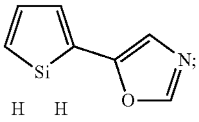 ; and 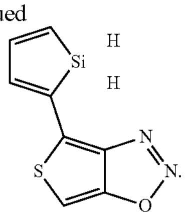

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a schematic of a lithium-ion battery cell.

DETAILED DESCRIPTION

A conventional electrolyte formulation for a lithium-ion battery will include a lithium salt such as $LiPF_6$ and a carbonate-based solvent. When a small amount of water is naturally introduced to the battery, the $LiPF_6$ may undergo a series of side reactions:

$$LiPF_6 \leftrightarrows LiF+PF_5$$

$$LiPF_6+H_2O \rightarrow LiF+HF+POF_3$$

$$PF_5+H_2O \rightarrow POF_3+2HF$$

$$POF_3+H_2O \rightarrow HPO_2F_2+HF$$

The hydrogen fluoride reacts with the cathode active material, releasing the transition metals into the electrolyte. Additives that scavenge hydrogen fluoride alone do not eliminate the problem, but rather reduce the hydrogen fluoride's negative impact.

High energy batteries will increasingly depend on layered oxides, with the amount of nickel in the layered oxides growing. Due to the cost and depleting reserves of cobalt, cathode active materials with diminished mole ratios of cobalt, or no cobalt altogether, have been developed. Nickel-rich NMC cathode active materials often have the formula $LiNi_xM_{1-x}O_2$, where $x \geq 0.6$ and M=Mn, Co, and sometimes Al. Manganese and aluminum are essentially inactive, providing stability to the properties of the battery. The more nickel used, the greater the amount of lithium that can be cycled in and out of the cathode.

However, nickel-rich cathode active materials face challenges. Nickel-rich cathode active materials are particularly susceptible to the hydrogen fluoride scavenging, resulting in dramatically decreased cell capacity. It is challenging to stabilize the nickel-rich cathode interface over long-term cycling, due in part to parasitic reactions, including electrolyte permeation, which results in the growth of impedance and capacity decay. Providing a stable CEI interface can suppress the electrolyte decomposition, improve the interface stability, and alleviate transition metal ion dissolution.

There are conventional electrolyte additives that are used to address one or more of these issues. Often, multiple additives are used in a formulation, each selected for a particular role but having a limited impact. With each cathode additive needed in the formulation, issues with compatibility with the other electrolyte components such as solvents and anode additives, as well as compatibility with the anode material, may present a new set of problems.

The electrolyte formulations disclosed herein contain an electrolyte additive specifically functionalized to organically create a physical barrier on the cathode surface. The physical barrier is a protective, uniform film that improves the interface stability, inhibits the decomposition of the electrolyte, inhibits the side reactions at the interface, scavenges hydrogen fluoride and/or water, with hydrogen fluoride quenching preferred, and oxidizes before the electrolyte solvents.

The disclosed electrolyte additives are specifically formulated to improve the performance of nickel-based cathode active materials. Nickel-based cathode active materials include, but are not limited to, $LiNiO_2$, $Li(Ni_{0.5}Mn_{0.5})O_2$, $LiNi_xCo_yMn_zO_2$, $LiNi_{0.5}Co_{0.5}PO_4$, and $LiNi_{0.8}Co_{0.15}Al_{0.05}O_2$. The nickel-based cathode active material can have the formula $LiNi_xM_{1-x}O_2$, where $x \geq 0.6$, and more particularly $x \geq 0.8$ (i.e., a nickel content of greater than 80%), and M=Mn, Co, and Al. As needed, the cathode active material can contain an electroconductive material, a binder, etc.

The disclosed electrolyte additives are also specifically formulated for lithium-ion batteries having an anode active material that is graphite or an anode active material that is a silicon-based material. The silicon-based material is not limited except to include some form of silicon or silicon alloy. Non-limiting examples of silicon-based anode material include Si, SiOx, and Si/SiOx composites. A conducting agent may be used. Further, one or more of a binder and a solvent may be used to prepare a slurry that is applied to a current collector, for example.

The liquid electrolytes disclosed herein have the following formulation: a solvent; a lithium salt; vinylene carbonate (VC); and an additive that satisfies the following: less than or equal to nine carbons; at least one unsaturated bond; a predicted oxidation potential $V_{ox}$ of $2.0<V_{ox}<4.5$; and a five-membered ring with a silicon heteroatom. The additive will only have atoms selected from the group consisting of: C; H; O; N; S and Si. The electrolytes may only have one of the disclosed additives or may have more than one of the disclosed additives.

The term "formulation" as used herein indicates that the formulation consists of the named components. However, it is contemplated herein that the electrolytes disclosed herein may comprise additional components.

The electrolyte additives are formulated to work with a carbonate-based solvent and lithium hexafluorophosphate ($LiPF_6$) as the lithium salt. In particular, the carbonate-based solvent can be one or more of ethylene carbonate (EC), diethyl carbonate (DEC), and fluoroethylene carbonate (FEC). The $LiPF_6$ has a molar concentration of 0.5M to 3.0M.

The electrolyte additives disclosed herein have also been found to create the physical CEI barrier when used with one or both of dioxolane (DOL) and dimethoxyethane (DME) with one or both of lithium bis(fluorosulfonyl)imide (LiFSI) and lithium bis(trifluoromethanesulfonyl)imide (LiTFSI). The total lithium salt has a molar concentration of 0.5M to 3.0M.

The electrolyte additives disclosed herein work with the VC, an anode-directed additive, to enhance the durability of the battery while operating in a voltage range of 2.0 V to 5.0 V. The VC can be 0.5 wt % to 3.0 wt % of the electrolyte. VC has been shown to have a positive impact on the capacity retention and coulombic efficiency of anodes in lithium-ion batteries, particularly with silicon-based anode active material.

The electrolyte additive or additives are between 0.1 wt % and 10.0 wt % of the electrolyte, and more particularly between 0.5 wt % and 5.0 wt % of the electrolyte.

The electrolyte additives disclosed herein have a predicted oxidation potential of between 2.0 and 4.5, which falls within the typical battery operating voltage range. The electrolyte additives oxidize in the operating voltage range, with the oxidation products participating in the CEI formation. The electrolyte additives may have a lower oxidation potential than the electrolyte as a whole.

The electrolyte additives disclosed herein can be described as having the following composition, wherein R1-6 can be H or a C group optionally containing one or more of H, O, N and S:

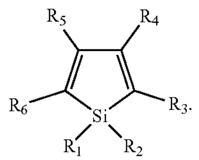

The five-membered ring having the silicon heteroatom quenches hydrogen fluoride (HF) with the following reactions:

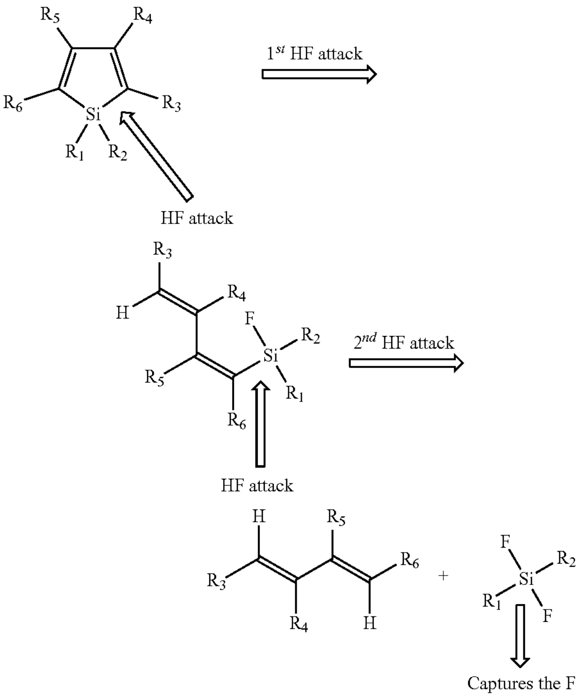

The electrolyte additive with the five-membered ring with the silicon heteroatom forms the CEI protective barrier by polymerizing the ethylene carbonate as shown below.

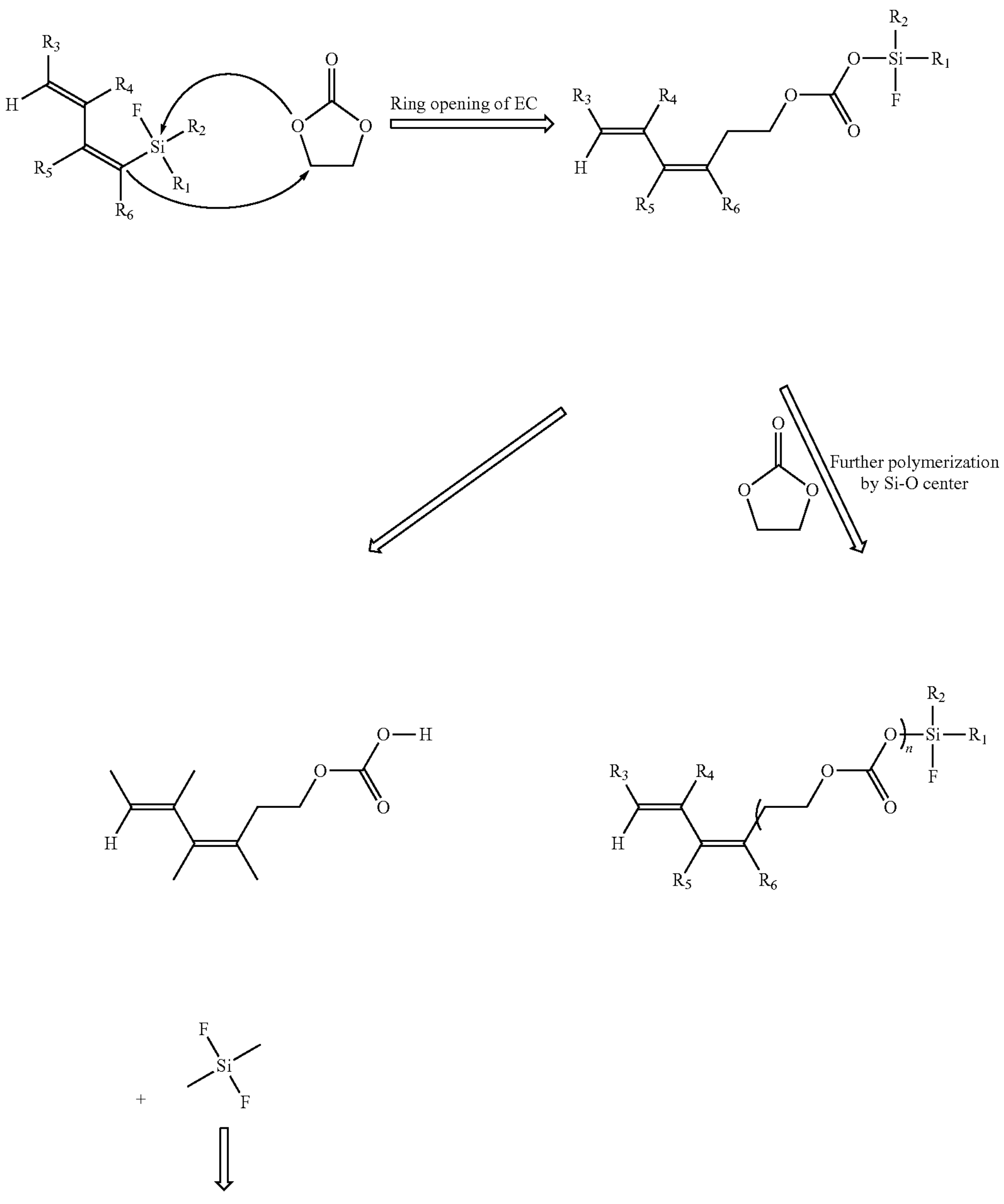
The attack on the carbonyl carbon occurs, with further polymerization by the Si—O center.
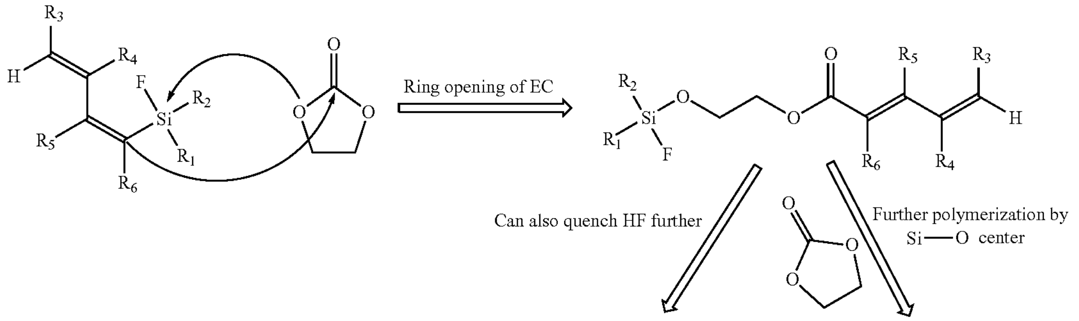

-continued

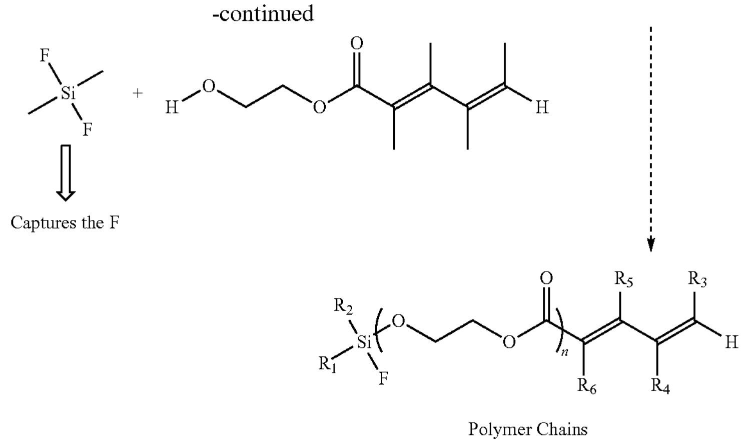

The electrolytes with the electrolyte additive formulations disclosed herein form a CEI during the first few cycles (i.e., less than 10) of the battery that is between 1 nm and 100 nm with very poor electron conductivity (i.e., less than $10^{-9}$ mS/cm). The CEI formed from polymerization of the electrolyte additives allows lithium ion penetration while preventing nickel dissolution and electrolyte oxidation. Hydrogen fluoride and/or water is scavenged, preventing HF attack.

Table 1 is a list of electrolyte additives.

TABLE 1

| Molecule | Formula | Predicted Oxidation Potential |
|---|---|---|
| 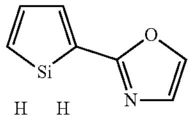 | $C_7H_7SiNO$ | 4.14 |
| 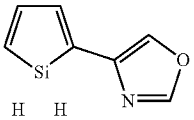 | $C_7H_7SiNO$ | 4.06 |
| 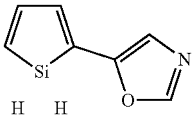 | $C_7H_7SiNO$ | 4.09 |
| 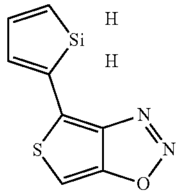 | $C_8H_6SiSN_2O$ | 4.26 |

A lithium-ion battery cell 100 is illustrated schematically in cross-section in FIG. 1. The lithium-ion battery cell 100 of FIG. 1 is configured as a layered battery cell that includes as active layers a cathode active material layer 102, an electrolyte 104 as disclosed herein, and an anode active material layer 106. The lithium-ion battery cell 100 may include a separator interposed between the cathode active material layer 102 and the anode active material layer 106. In addition to the active layers, the lithium-ion battery cell 100 of FIG. 1 may include a cathode current collector 108 and an anode current collector 110, configured such that the active layers are interposed between the anode current collector 110 and the cathode current collector 108. In such a configuration, the cathode current collector 108 is adjacent to the cathode composite layer 102, and the anode current collector 110 is adjacent to the anode active material layer 106. A lithium-ion battery can be comprised of multiple lithium battery cells 100.

The cathode current collector 108 can be, for example, an aluminum sheet or foil. The anode current collector 110 can be a copper or nickel sheet or foil, as a non-limiting example. Examples of the separator are porous films of polyolefin such as polyethylene and polypropylene.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A lithium-ion battery, comprising:

anode active material;

nickel-based cathode active material; and an electrolyte having a formulation as follows:

a carbonate-based solvent;

$LiPF_6$;

vinylene carbonate; and one or more additives selected from:

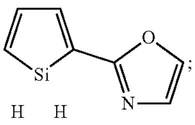 ; 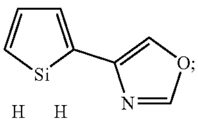 ;

-continued

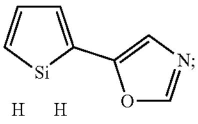
and
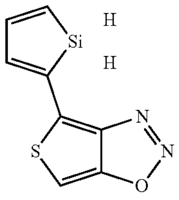

2. The lithium-ion battery of claim 1, wherein the nickel-based cathode active material has a nickel content of greater than 80%.

3. The lithium-ion battery of claim 1, wherein the anode active material is graphite.

4. The lithium-ion battery of claim 1, wherein the anode active material is a silicon-based material.

5. A lithium-ion battery, comprising:
anode active material;
nickel-based cathode active material; and
an electrolyte comprising:
a solvent;
a lithium salt;
vinylene carbonate; and
one or more additives selected from:

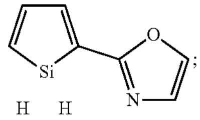
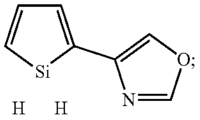

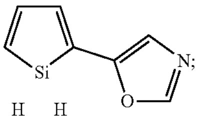
and
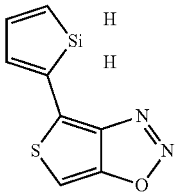

6. The lithium-ion battery of claim 5, wherein the solvent is one or more of ethylene carbonate, diethyl carbonate and fluoroethylene carbonate and the lithium salt is $LiPF_6$.

7. The lithium-ion battery of claim 5, wherein the solvent is one or both of dioxolane and dimethoxyethane and the lithium salt is one or both of LiTFSI and LiFSI.

8. The lithium-ion battery of claim 5, wherein the nickel-based cathode active material has a nickel content of greater than 80%.

9. The lithium-ion battery of claim 5, wherein the vinylene carbonate is 0.5 wt % to 3.0 wt % of the electrolyte.

10. The lithium-ion battery of claim 5, wherein the anode active material is graphite.

11. The lithium-ion battery of claim 5, wherein the anode active material is a silicon-based material.

12. A liquid electrolyte for a lithium-ion battery, comprising:
one or more additives selected from the group consisting of:

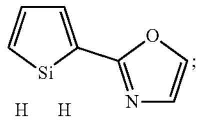
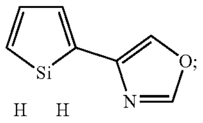

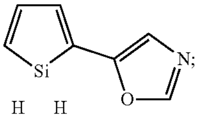
and
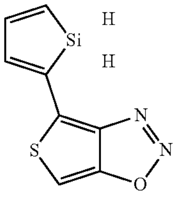

* * * * *